June 19, 1962 — G. S. INMAN — 3,039,294
APPARATUS AND METHOD FOR TESTING AND DETECTING LEAKY CUPS
Filed Dec. 15, 1959 — 3 Sheets-Sheet 1
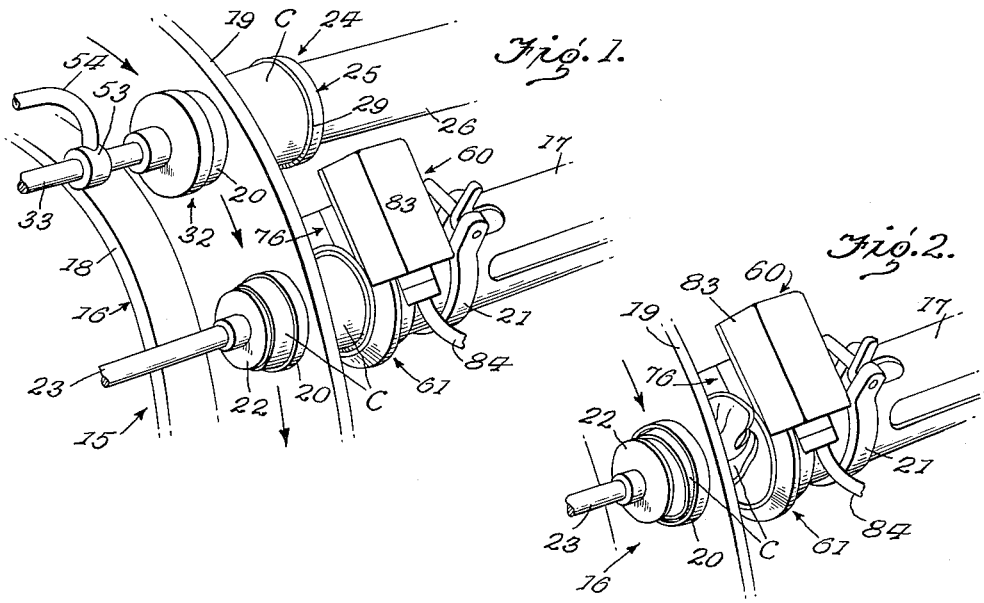
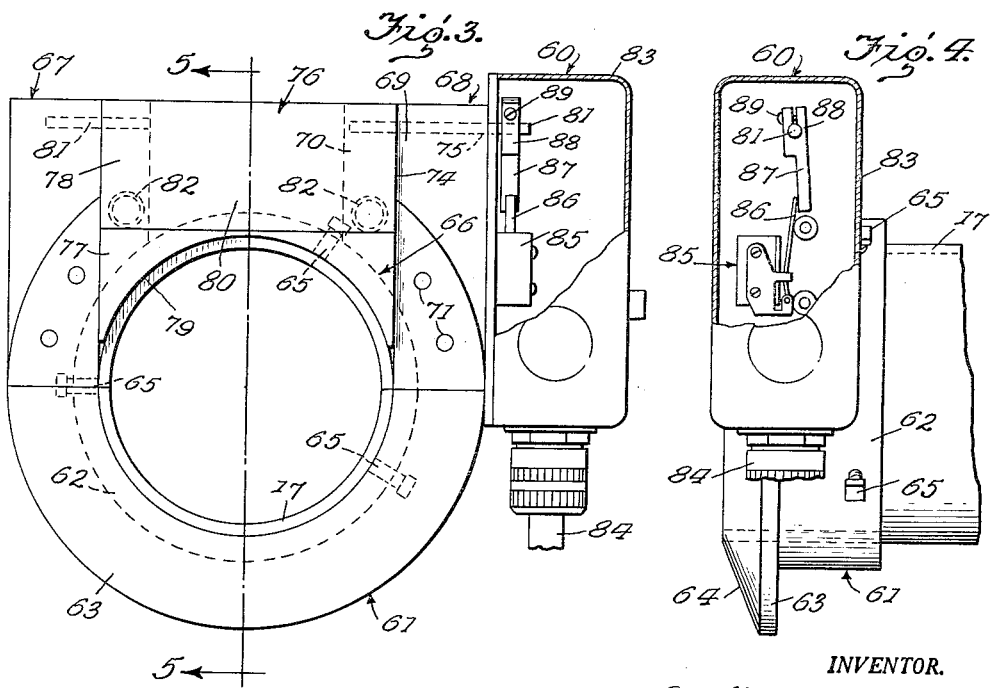
INVENTOR.
Geoffrey S. Inman
BY Mason, Porter, Diller & Stewart
attys.

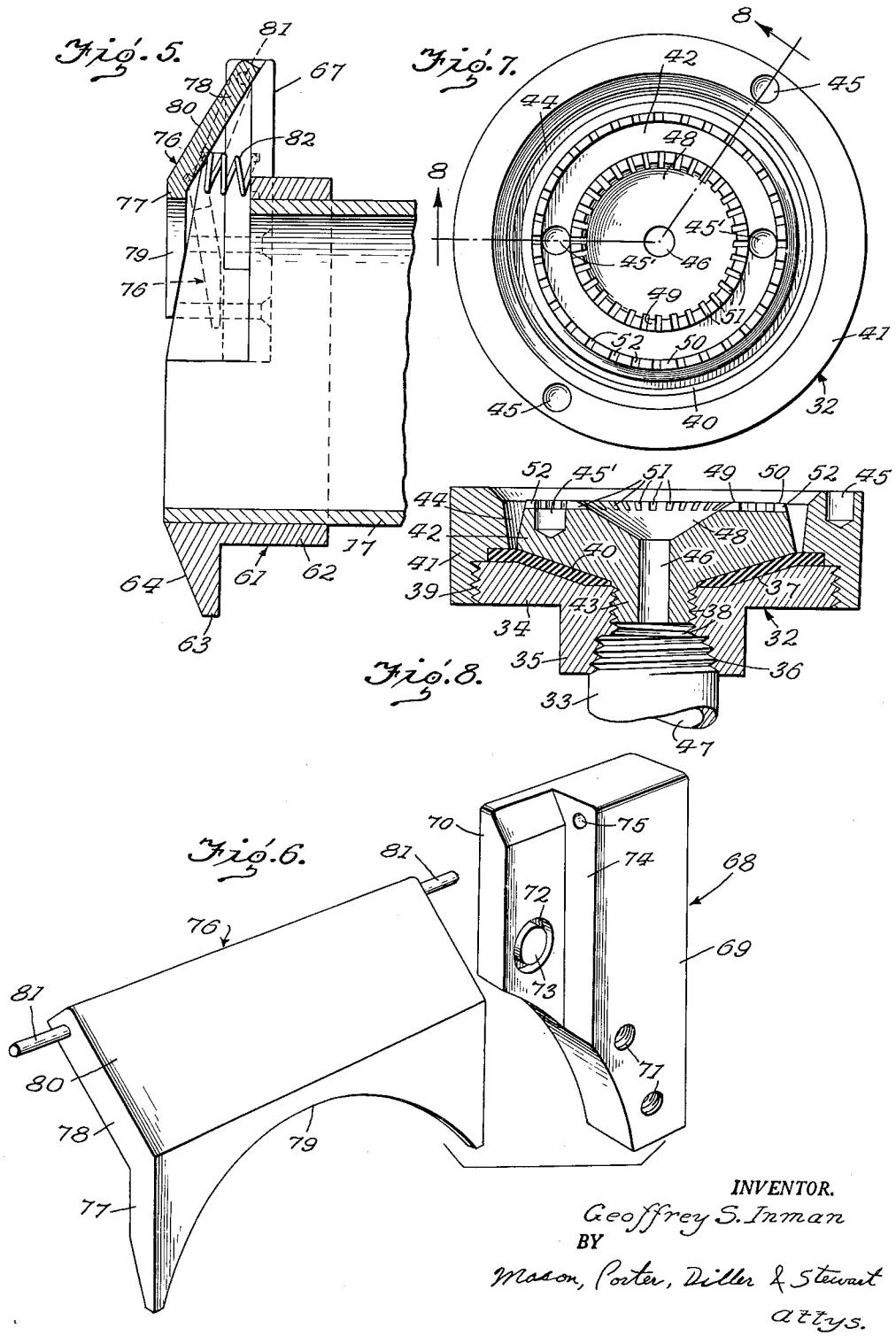

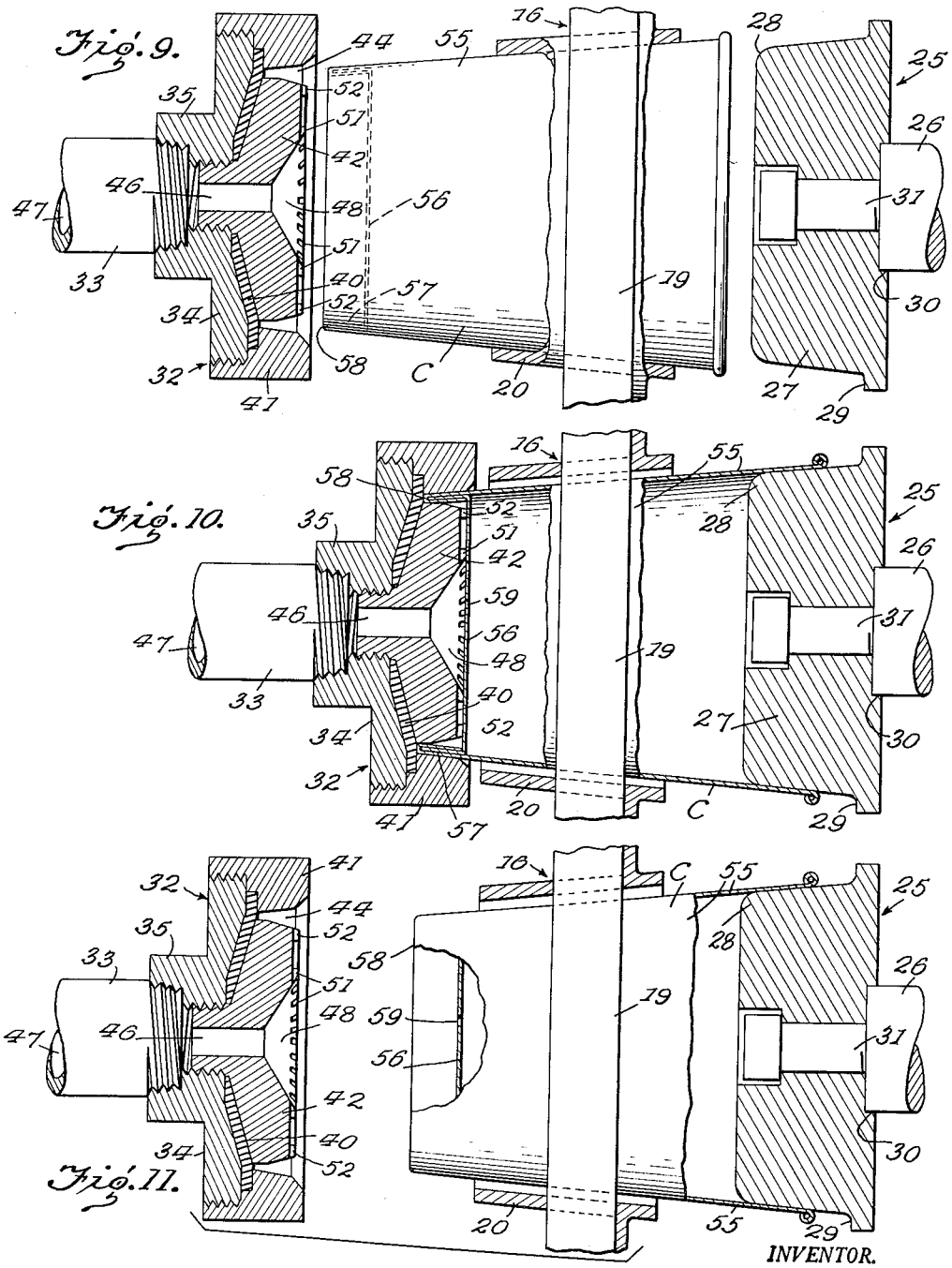

United States Patent Office 3,039,294
Patented June 19, 1962

3,039,294
APPARATUS AND METHOD FOR TESTING AND DETECTING LEAKY CUPS
Geoffrey S. Inman, East Rutherford, N.J., assignor to Continental Can Company, Inc., New York, N.Y., a corporation of New York
Filed Dec. 15, 1959, Ser. No. 859,749
21 Claims. (Cl. 73—45.1)

This invention relates in general to new and useful improvements in the art of making cups, and more particularly relates to a method of testing cups for leaks before removal from a paper cup making machine and detecting such leaky cups.

One of the major problems encountered in the paper cup manufacturing industry is the manufacture of cups having leaks which go undetected and are delivered to the consumer. Although only a very small percentage of the cups manufactured have leaks present, this is no consolation to a user who has just had the contents of his leaky cup drip onto his clothing. The cause of holes in the bottom of a cup are generally twofold. Some holes are present in the paper as delivered from the manufacturer. Other holes occur when blanking out the cup bottom, due to a bottom being blanked with a portion of the circumference of the blank accidentally extending into the opening left by the preceding blanked out bottom. The present invention proposes to test the bottoms of cups for leaks while they are still in the cup making machine and to remove the leaky cups from the machine prior to the delivery of the cups to the delivery tube of the machine.

Another object of the invention is to provide a leak detector for use on a paper cup making machine, the leak detector engaging and testing a cup for a leak while it is carried by the turret of the cup making machine, the leak detector functioning to retain a leaky cup in position momentarily while the turret indexes so that the indexing of the turret will result in the crushing of a leaky cup, thus providing an indication that the cup is defective.

Still another object of the invention is to provide a leak detector for use with a cup carrier, the leak detector including a plug adapted to be received in the open end of a cup and a suction head adapted to form a seal with the bottom of the cup, the plug and suction head being disposed in alignment on opposite sides of the path of a cup and being at a position where the cup is momentarily stationary after the cup carrier has indexed, the suction head being movable to force the cup onto the plug and the suction effect on the bottom of a good cup being sufficient to remove the cup from the plug, defective cups remaining on the plug and being crushed as the cup carried rotates relative to the plug during the next indexing thereof.

A further object of the invention is to provide a leak detector for use on a cup making machine of the type which includes a cup carrying turret and a delivery tube for finished cups, the leak detector serving to cooperate with the cup carrying turret to crush defective cups, and there being provided means at the entrance to the delivery tube for detecting the existence of crushed cups and to operate a switch controlling the operation of the cup making machine to momentarily shut down the cup making machine until the crushed cup has been removed therefrom.

Yet another object of the invention is to provide a novel detector for detecting cups which have been crushed to indicate the cups as having leaks therein, the detector being placed at the entrance to a delivery tube of a cup making machine and being in the form of a gate assembly which is pivotally mounted and which operates a switch for controlling the operation of the cup making machine, the configuration and position of the gate assembly being such that a good cup passes thereby into the delivery tube and the gate assembly is engaged only by a crushed cup.

Still another object of the invention is to provide a novel suction head for testing cups for leaks in the bottoms thereof, the suction head including a sealing ring against which the bottom flange of a cup seats, and guide means for guiding the bottom flange of a cup into engagement with the sealing ring, the guide means also serving to hold the sealing ring in place and a portion of the guide means having a suction passage therethrough for applying the required suction to the underside of the cup bottom.

A still further object of the invention is to provide a novel method of testing and detecting leaky cups, the method including the steps of engaging a cup carried by a turret of a cup making machine and forcing the open end of the cup over a plug while engaging the bottom of the cup with a suction head, and then moving the suction head away from the plug so as to remove cups passing the test from the plug and leaving defective cups on the plug so that as the turret of the cup making machine indexes, the cup will be crushed as it is pulled off of the plug, and then detecting the crushed cup at the entrance to a delivery tube of the cup making machine with the detecting means controlling the operation of the machine, thereby stopping the machine to permit the manual removal of the crushed cup.

With the above, and other objects in view that will hereinafter appear, the nature of the invention will be more clearly understood by reference to the following detailed description, the appended claims, and the several views illustrated in the accompanying drawings.

In the drawings:

FIGURE 1 is a fragmentary perspective view showing a portion of a conventional cup making machine and the general details of the leaky cup detecting mechanism mounted thereon.

FIGURE 2 is a fragmentary perspective view of the cup making machine of FIGURE 1, and shows a crushed cup operating the detecting means as it is being forced into the delivery tube of the cup making machine.

FIGURE 3 is an enlarged elevational view of the entrance end of the delivery tube, and shows the specific details of the crushed cup detecting mechanism.

FIGURE 4 is an enlarged side elevational view of the entrance end of the delivery tube, and shows further the details of the crushed cup detecting mechanism, the housing of a switch assembly being broken away and shown in section in order to clearly illustrate the details of the switch mounted therein.

FIGURE 5 is an enlarged fragmentary transverse vertical sectional view taken along the section line 5—5 of FIGURE 3, and shows the specific mounting of the gate assembly of the crushed cup detecting mechanism.

FIGURE 6 is an enlarged fragmentary exploded perspective view showing the details of the gate assembly and the manner in which it is mounted.

FIGURE 7 is an enlarged plan view of the suction head, and shows the specific details thereof.

FIGURE 8 is an enlarged vertical sectional view taken through the suction head of FIGURE 7, along the line 8—8, and shows the specific details of construction of the suction head.

FIGURE 9 is a schematic view with the suction head and plug shown in section, of the means for detecting a leak in a cup and for crushing a leaky cup, with the cup being initially positioned between the plug and the suction head.

FIGURE 10 is a view similar to FIGURE 9, and shows the cup being tested.

FIGURE 11 is a view similar to FIGURES 9 and 10, and shows a leaky cup retained on the plug and ready to be crushed by the rotation of the cup carrier.

Reference is now made to FIGURE 1 of the drawings, wherein a portion of a conventional cup making machine is illustrated, the cup making machine being generally referred to by the numeral 15. Only those portions of the cup making machine directly involved with the present invention will be described. These include a vertically disposed turret or cup carrier, generally referred to by the numeral 16, and a delivery tube 17. The cup carrier 16 includes a cylindrical flange 18 which has projecting outwardly therefrom an annular flange 19. The annular flange 19 is provided with a plurality of cup holders 20, the cup holders 20 extending through the annular flange 19 and being disposed in circumferentially spaced relation.

The delivery tube 17 is suitably supported adjacent one side of the turret 16 by means including a supporting clamp 21. The turret 16 receives completed cups from other components of the cup making machine 15, and the turret 16 is driven so that it indexes with each cup holder 20 stopping in alignment with the delivery tube 17. A horizontally reciprocating cup ejector 22 is carried by a horizontally reciprocating shaft 23 in alignment with the delivery tube 17 and on the opposite side of the turret 16 therefrom. When the turret 16 indexes in alignment with the delivery tube 17, the cup ejector 22 is actuated to push a cup C from the cup holder 20 aligned with the delivery tube 17 into the delivery tube 17.

As has been previously stated, when the cups C are formed, on rare occasions the bottoms thereof have pin holes therein. These pin holes, no matter how seldom they occur, are objectionable and it is desired to remove the cups having such pin holes. It is also desirable to remove the cups at the earliest possible point in the cup line so as to eliminate any subsequent operation which may be made thereon. In accordance with this invention, it is proposed to eliminate the transfer of a defective cup C from the turret 16 to the delivery tube 17.

The present invention proposes to mount a cup testing and crushing assembly, generally referred to by the numeral 24, along the path of the cups C carried by the turret 16 in advance of the delivery tube 17. The assembly 24 includes a fixed plug 25 carried by a shaft or arm 26 which is supported by the frame of the cup making machine 15, the plug 25 being fixed at all times. The plug 25 is positioned in alignment with a station of the turret 16 when it indexes, which station is in advance of the delivery tube 17.

Reference is now made to FIGURE 9, for example, wherein the specific details of the plug 25 are illustrated. The plug 25 includes a generally frusto-conical body portion 27 having a rounded forward end portion 28 to facilitate the movement of the open end of a cup C over the plug 25. The body portion 27 terminates in an outwardly directed shoulder 29. The rear part of plug 25 is recessed as at 30 to receive an end of the shaft 26. A capscrew or other type of threaded fastener 31 extends through the plug 25 to secure the plug 25 to the shaft 26. It is to be noted that the capscrew 31 is recessed entirely within the plug 25. It is also to be understood that the connection between the plug 25, the shaft 26, and the capscrew 31 is to be sealed so as to prevent any flow of air through the plug 25.

The assembly 24 also includes a suction head, generally referred to by the numeral 32. The suction head 32 is disposed on the opposite side of the turrent 16 from the plug 25 and is in alignment therewith. The suction head 32 is supported by a horizontally disposed shaft 33 which is mounted for reciprocatory movement from left to right in the turret, as viewed in FIGURE 1.

The details of the suction head 32 are best illustrated in FIGURES 7 and 8.

The suction head 32 includes a mounting head 34 which has a reduced rearwardly projecting annular portion 35. The annular portion 35 has an internally threaded bore 36 in the rear part thereof in which an end of the support 33 is received. The mounting head 34 also includes a mounting face 37 which is centrally recessed. An internally threaded bore 38 opens through the center of the mounting face 37, the bore 38 functioning as a reduced extension of the bore 36. The mounting head 34 is also provided with external threads 39.

A sealing ring 40 overlies a major portion of the mounting face 37. An outer retainer 41 is threadedly engaged with the threads 39 of the mounting head 34. The outer retainer 41 is in the form of a ring which clamps an outer portion of the sealing ring 40 against the mounting face 37.

The suction head 32 also includes an inner retainer 42. The inner retainer 42 is provided with a reduced extension 43 which is threadedly engaged in the bore 38 to retain the inner retainer 42 in place, the inner retainer 42 clamping an inner portion of the sealing ring 40 against the mounting face 37.

It is to be noted that the inner surface of the outer retainer 41 is spaced outwardly of and generally concentric to the outer surface of the inner retainer 42. The opposed surfaces of the retainers 41 and 42 are slightly tapered to form an annular guideway 44 to guide the cups C relative to the suction head 32 and into engagement with the sealing ring 40. For convenience of assembly, the outer retainer 41 is provided with spanner wrench receiving openings 45, and the inner retainer 42 is provided with spanner wrench receiving openings 45'.

The inner retainer 42 also functions to apply the vacuum to the bottom of the cup C. The inner retainer 42 is provided with a central bore 46 therethrough which opens into the support 33 through the mounting head 34, the support 33 having a longitudinal bore 47 in an end portion thereof. The forward or outer portion of the bore 46 is enlarged and is generally conical, the outer portion being referred to by the numeral 48. In order to assure distribution of the suction force over the bottom of the cup C being tested, the face of the inner retainer 42 is defined by a pair of concentric rings 49 and 50 which project above the remainder of the inner retainer 42. Further, the rings 49 and 50 are provided with a plurality of radial recesses 51 and 52, respectively.

Reference is again made to FIGURE 1 wherein it is illustrated that the support 33 is provided with a fitting 53 adjacent its connection with the suction head 32. The fitting 53 opens into the interior of the support 33 and communicates with the bore 47 in the end thereof. A suction line 54 is connected to the fitting 53 so as to produce a suction or vacuum in the suction head 32.

Reference is now made to FIGURES 9, 10 and 11. It is to be noted that the cup C is formed of a tubular body 55 and a bottom 56, the bottom being connected to the tubular body 55 by a folded seam 57 which defines a bottom flange 58. It is this bottom flange 58 which engages and forms a seal with the sealing ring 40.

When the turret or cup carrier 16 indexes, a respective one of the cup holders 20 is aligned with the plug 25 and the suction head 32. At this time, the support 33 moves to the right and the bottom flange 58 of the cup C moves into the guideway 44 and is guided by the retainers 41 and 42 into engagement with the sealing ring 40. Further movement of the suction head 32 to the right results in the movement of the cup C over the plug 25 with the result that the cup C is supported solely by the suction head 32 and the plug 25, as is best shown in FIGURE 10. The tapered surfaces of the cup C and the plug 25 are such that a seal is formed between the cup C and the plug 25. In the event there is no opening in the bottom 56 of the cup C, when the suction head 32 is withdrawn to the left, as viewed in FIGURE 11, the suction effect on the bottom of the cup C will be such that the cup C is pulled off the plug 25 and is again seated in the cup holder 20. On the other hand, should the bottom 56 have an opening of any size, such as the opening 59, during the short period of time which the suction head 32 is engaged with the cup C, a vacuum will be produced within the interior of the cup C, due to the seal thereof with the plug 25. As a result, the pressures within the cup C and outside of the bottom 56 thereof will be substantially equalized, and the suction effect of the suction head 32 on the cup C will be substantially nullified. As a result, when the suction head 32 retracts to the left, as viewed in FIGURE 11, the cup C will remain on the plug 25. Then, as the turret 16 indexes, the cup C will be twisted and crushed as it is pulled off the plug 25.

It is, of course, possible to visually detect the cup C after it has been crushed, and the cup making machine 15 could be manually stopped to permit removal of such a crushed cup. However, in order to assure the removal of each of the crushed cups, the invention also proposes to provide the cup making machine 15 with a crushed cup detector, generally referred to by the numeral 60. The crushed cup detector 60 is mounted on the delivery tube 17 at the entrance end thereof. The crushed cup detector 60 includes a mounting collar, generally referred to by the numeral 61. The mounting collar 61 includes a sleeve portion 62 and a flange 63 which has a beveled surface 64. The flange 63 extends outwardly of the sleeve portion 62 at one end thereof.

It is to be noted that the mounting collar 61 is telescoped over the entrance end of the delivery tube 17, the sleeve portion 62 conforming generally to the exterior size of the delivery tube 17. The sleeve portion 62 carries circumferentially spaced setscrews 65 which are threaded into clamping engagement with the delivery tube 17 to retain the mounting collar 61 thereon.

The flange 63 has a portion thereof facing the direction of movement of cups towards the delivery tube 17, removed to define a recess 66. A pair of mounting brackets 67 and 68 are secured to the rear surface of the flange 63 on opposite sides of the recess 66. The mounting bracket 68 is best illustrated in FIGURE 6, and includes a main portion 69 which is disposed outwardly of the recess 66 and an auxiliary portion 70 which is in overlapping relation with respect to the recess 66, the portions 69 and 70 being integrally formed. The lower part of the portion 69 is provided with a pair of internally threaded bores 71 for the reception of fasteners to secure the mounting bracket 68 on the mounting collar 61.

The reduced thickness portion 70 is provided with an annular recess 72 which surrounds a retaining pin 73, the recess 72 being for the purpose of receiving a spring to be described in detail hereinafter. The portion 69 also includes a shoulder 74 which opposes the recess 66. A bore 75 opens through the shoulder 74.

The bracket 67 is very similar to the bracket 68, except that it is of a left hand construction whereas the bracket 68 is of a right hand construction. Accordingly, further description of the bracket 67 is believed to be unnecessary.

A gate member 76 extends between and is supported by the brackets 67 and 68 in alignment with the recess 66. The gate member 76 is of an angular cross-section and includes an inner portion 77 and an outer portion 78. The inner portion 77 is provided with an arcuate recess 79 which corresponds to the outer surface of the entrance end of the delivery tube 17, thus providing a clearance between the gate member 76 and the delivery tube 17. The outer portion 78 has a face 80 which functions as a cam surface, due to the angular relation thereof with respect to the inner portion 77. A pair of pins, or a single elongated pin 81 projects from the opposite edges of the gate member 76 and is received in respective ones of the bores 75 to pivotally mount the gate member 76.

As is best illustrated in FIGURE 5, the gate member 76 is normally urged outwardly by springs 82 carried by the brackets 67 and 68. In the at-rest position of the gate member 76, the outer surface of the lower portion 77 is generally coplanar with the front surface of the mounting collar 61. When a normal cup C is presented to the entrance end of the delivery tube 17, it will clear the gate member 76 and will be forced into the delivery tube 17 by the cup ejector 22 without touching the gate member 76.

On the other hand, when a crushed cup, such as the crushed cup C of FIGURE 2, advances towards the delivery tube 17, in most instances the crushed cup will engage the cam face surface 80 of the gate member 76 and pivot the gate member 76 inwardly towards the dotted line position of FIGURE 5. In some instances, the crushed cup will be so disfigured that it will clear the gate member 76 as the turret 16 indexes. However, when the crushed cup is ejected from the turret 16, it will engage the gate member 76 due to the fact that the cup will be offset to one side of its original position. Thus, once again, the gate member 76 will be pivoted.

It is the intention of this invention that the gate member 76 operate a switch which controls the operation of the cup making machine 15. To this end, a switch box 83 is mounted on the mounting bracket 68. The switch box 83 has a conductor housing 84 leading therefrom to the controls of the cup making machine 15. A Microswitch 85 is mounted within the switch box 83, the Microswitch 85 having an arm 86 for operating the same. It is to be understood that the Microswitch 85 is normally closed and is opened upon the pivoting of the arm 86.

The pin 81 associated with the mounting bracket 68 is of a length to extend entirely through the mounting bracket 68 and into the switch box 83, as is best illustrated in FIGURE 3. A switch actuating arm 87 is adjustably clamped onto the end of the pin 81. The switch actuating arm 87 has a bifurcated end portion 88 and a clamping screw 89 to effect the adjustable connection between the pin 81 and the arm 87. The arm 87 engages the switch actuator arm 86 to open the switch 85 when the gate member 76 is pivoted.

From the foregoing, it will be readily apparent that this invention seeks to first detect the existence of a relatively large pin hole type leak in the bottom of a paper cup while the paper cup is still being carried by the turret of a cup making machine. Secondly, the invention proposes to identify a defective cup by crushing the cup. Thirdly, after the cup has been crushed, in order to avoid the necessity of visual detection of the crushed cup, suitable crushed cup detecting means are mounted on the entrance end of the delivery tube of the cup making machine so as to detect the existence of a crushed cup and to stop the operation of the cup making machine. The crushed cup may then be removed from the cup making machine by the operator of the machine and the cup making machine restarted. Since the defective cups appear only rarely, this manual removal of the crushed cups does not greatly interfere with the production of the cup making machine.

From the foregoing, it will be seen that novel and advantageous provision has been made for carrying out the desired end. However, attention is again directed to the fact that variations may be made in the example method and apparatus disclosed herein without departing from the spirit and scope of the invention as defined in the appended claims.

I claim:
1. A detector for leaks in cups comprising a cup carrier having means for loosely supporting cups for movement generally longitudinally of the cups and relative to the carrier, a plug adapted to be received in an open end of a cup and form a seal therewith, and a suction head for engaging and forming a seal with a cup bottom, said plug and said suction head being mounted in opposed relation on opposite sides of the path of cups carried by said cup carrier, said suction head having support means mounting said suction head for reciprocatory movement first towards said plug and then away from said plug in timed relation to the movement of said cup carrier, whereby when a cup carried by said cup carrier is aligned with said plug and said suction head, said suction head engages the bottom of the cup and forces the open end of the cup over and into sealed engagement with said plug, after which said suction head is retracted normally pulling the cup off of said plug but leaving a defective cup on said plug.

2. A detector for leaks in cups comprising a cup carrier having means for loosely supporting cups for movement generally longitudinally of the cups and relative to the carrier, a plug adapted to be received in an open end of a cup and form a seal therewith, and a suction head for engaging and forming a seal with a cup bottom, said plug and said suction head being mounted in opposed relation on opposite sides of the path of cups carried by said cup carrier, said suction head having support means mounting said suction head for reciprocatory movement first towards said plug and then away from said plug in timed relation to the movement of said cup carrier, whereby when a cup carried by said cup carrier is aligned with said plug and said suction head, said suction head engages the bottom of the cup and forces the open end of the cup over and into sealed engagement with said plug, after which said suction head is retracted normally pulling the cup off of said plug but leaving a defective cup on said plug, said cup carrier moving relative to said plug whereby the cup remaining on the plug will be crushed.

3. The detector of claim 1 wherein said cup carrier is in the form of a turret which is periodically indexed, the indexing of the turret coinciding with the positions of said plug and said suction head.

4. The detector of claim 1 wherein said cup carrier is part of a cup forming machine having a delivery tube, and said plug and said suction head being disposed in advance of said delivery tube, whereby defective cups are detected prior to exiting from said cup forming machine.

5. The detector of claim 1 wherein said cup carrier is in the form of a turret which is periodically indexed, the indexing of the turret coinciding with the positions of said plug and said suction head, and said plug being fixed, whereby when a defective cup remains on said plug, the defective cup is crushed during the next indexing of said turret.

6. The detector of claim 1 wherein said suction head includes a sealing ring for engagement with a cup bottom flange, and guide means adjoint said sealing ring for guiding cups into engagement with said sealing ring.

7. The detector of claim 1 wherein said suction head includes a mounting head having a mounting face, a sealing ring overlying said face of said mounting head, an outer retainer carried by said mounting head and clamping an outer portion of said sealing ring against said mounting face, and an inner retainer carried by said mounting head and clamping an inner portion of said sealing ring against said mounting face, said retainers being disposed is spaced concentric relation and functioning as guides to lead a cup bottom into engagement with said sealing ring.

8. The detector of claim 7 wherein said inner retainer and said mounting head have aligned communicating axial suction passages, and said inner retainer has a cup bottom opposing face with a plurality of suction passages therein to assure generally equal suction effect completely over a cup bottom.

9. In a cup handling machine including a moving cup carrier and a cup delivery tube for receiving cups from said cup carrier, a leaky cup detector, said leaky cup detector comprising cup testing means for engaging and testing cups carried by said cup carrier in advance of said delivery tube, said cup testing means including means for crushing defective cups, and means at the entrance to said delivery tube for detecting crushed cups.

10. In a cup handling machine including a moving cup carrier and a cup delivery tube for receiving cups from said cup carrier, a leaky cup detector, said leaky cup detector comprising cup testing means for engaging and testing cups carried by said cup carrier in advance of said delivery tube, said cup testing means including means for crushing defective cups, and means at the entrance to said delivery tube for detecting crushed cups, said means including a switch controlling the operation of said cup handling machine.

11. In a cup handling machine including a moving cup carrier and a cup delivery tube for receiving cups from said cup carrier, a leaky cup detector, said leaky cup detector comprising cup testing means for engaging and testing cups carried by said cup carrier in advance of said delivery tube, said cup testing means including means for crushing defective cups, and means at the entrance to said delivery tube for detecting crushed cups, said means including a pivotally mounted gate assembly mounted for engagement by crushed cups only, and a switch connected to and controlled by the position of said gate assembly.

12. The leaky cup detector of claim 11 wherein said gate assembly has a sloping surface normally engaged by a crushed cup as it approaches alignment with said delivery tube.

13. In a cup handling machine including a moving cup carrier of the type having cup holding means for holding cups for movement generally longitudinally of the cups and relative to the carrier, and a cup delivery tube for receiving cups from said cup carrier, a leaky cup detector, said leaky cup detector comprising cup testing means for engaging and testing cups carried by said cup carrier in advance of said delivery tube, said cup testing means including a plug adapted to be received in an open end of a cup and form a seal therewith and a suction head for engaging and forming a seal with a cup bottom, said plug and said suction head being mounted in opposed relation on opposite sides of the path of cups carried by said cup carrier, said suction head having support means mounting said suction head for reciprocatory movement first towards said plug and then away from said plug in timed relation to the movement of said cup carrier, said plug being fixed with the movement of said cup carrier, relative to a defective cup remaining on said cup carrier effecting the crushing of the cup, and means at the entrance to said delivery tube for detecting crushed cups.

14. The leaky cup detector of claim 13 wherein said crushed cup detecting means includes a pivotally mounted gate assembly mounted for engagement by crushed cups only, and a switch connected to and controlled by the position of said gate assembly.

15. The leaky cup detector of claim 14 wherein said gate assembly has a sloping surface normally engaged by a crushed cup as it approaches alignment with said delivery tube.

16. A suction head for a leaky cup tester comprising a mounting head having a mounting face, a sealing ring overlying said face of said mounting head, an outer retainer carried by said mounting head and clamping an outer portion of said sealing ring against said mounting face, and an inner retainer carried by said mounting head and clamping an inner portion of said sealing ring against said mounting face, said retainers being disposed in spaced concentric relation and functioning as guides to lead a cup bottom into engagement with said sealing ring.

17. The suction head of claim 16 wherein said inner retainer and said mounting head have aligned communicating axial suction passages, and said inner retainer has a cup bottom opposing face with a plurality of suction passages therein to assure generally equal suction effect completely over a cup bottom.

18. A method of detecting leaks in cups comprising the steps of engaging a cup bottom with a suction head and forcing the open end of the cup over a plug, and then withdrawing the suction head relative to the plug to remove the cup from the plug utilizing the suction effect of the suction head on the cup to pull cups passing the test from the plug, defective cups remaining on the plug.

19. A method of detecting leaks in cups carried by a cup carrier comprising the steps of engaging a cup bottom with a suction head and forcing the open end of the cup over a plug, then withdrawing the suction head relative to the plug to remove the cup from the plug utilizing the suction effect of the suction head on the cup to pull cups passing the test from the plug, defective cups remaining on the plug, and moving the cup carrier relative to the plug to crush the defective cup.

20. A method of detecting leaks in cups carried by a cup carrier comprising the steps of engaging a cup bottom with a suction head and forcing the open end of the cup over a plug, then withdrawing the suction head relative to the plug to remove the cup from the plug utilizing the suction effect of the suction head on the cup to pull cups passing the test from the plug, defective cups remaining on the plug, moving the cup carrier relative to the plug to crush the defective cup, further moving the cup carrier together with the defective cup, and detecting and removing the defective cup.

21. A method of detecting leaks in cups carried by a cup carrier comprising the steps of engaging a cup bottom with a suction head and forcing the open end of the cup over a plug, then withdrawing the suction head relative to the plug to remove the cup from the plug utilizing the suction effect of the suction head on the cup to pull cups passing the test from the plug, defective cups remaining on the plug, moving the cup carrier relative to the plug to crush the defective cup, further moving the cup carrier to align cups carried thereby to a discharge station, discharging good cups at the discharge station, and detecting the crushed defective cup at the discharge station and removing the same.

References Cited in the file of this patent
UNITED STATES PATENTS

| | | |
|---|---|---|
| 2,162,209 | Trutner | June 13, 1939 |
| 2,293,290 | Gammeter | Aug. 18, 1942 |
| 2,330,229 | Maher | Sept. 28, 1943 |
| 2,485,040 | Cupo | Oct. 18, 1949 |